United States Patent
Kato et al.

(10) Patent No.: US 10,722,870 B2
(45) Date of Patent: Jul. 28, 2020

(54) EXHAUST GAS PURIFICATION CATALYST

(71) Applicant: Mitsui Mining & Smelting Co., Ltd., Tokyo (JP)

(72) Inventors: Sumio Kato, Akita (JP); Masataka Ogasawara, Akita (JP); Toshiharu Moriya, Saitama (JP); Katsuya Iwashina, Saitama (JP); Hironori Iwakura, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 16/473,309

(22) PCT Filed: Dec. 22, 2017

(86) PCT No.: PCT/JP2017/046119
§ 371 (c)(1),
(2) Date: Jun. 25, 2019

(87) PCT Pub. No.: WO2018/123862
PCT Pub. Date: Jul. 5, 2018

(65) Prior Publication Data
US 2019/0336949 A1    Nov. 7, 2019

(30) Foreign Application Priority Data
Dec. 27, 2016 (JP) ................................ 2016-252336

(51) Int. Cl.
| | | |
|---|---|---|
| *B01J 23/72* | (2006.01) | |
| *B01J 23/745* | (2006.01) | |
| *B01J 23/75* | (2006.01) | |
| *B01J 23/755* | (2006.01) | |
| *B01J 23/83* | (2006.01) | |
| *B01J 23/825* | (2006.01) | |
| *B01J 23/86* | (2006.01) | |
| *B01J 23/88* | (2006.01) | |
| *B01J 35/10* | (2006.01) | |
| *B01J 23/889* | (2006.01) | |
| *F01N 3/28* | (2006.01) | |

(52) U.S. Cl.
CPC ........... *B01J 23/868* (2013.01); *B01J 23/745* (2013.01); *B01J 23/825* (2013.01); *B01J 23/8892* (2013.01); *B01J 35/10* (2013.01); *F01N 3/2807* (2013.01); *F01N 3/2825* (2013.01)

(58) Field of Classification Search
CPC . B01J 23/72; B01J 23/745; B01J 23/75; B01J 23/755; B01J 23/83; B01J 23/825; B01J 23/868; B01J 23/8892; B01J 35/10
See application file for complete search history.

(56) References Cited

U.S. PATENT DOCUMENTS

| | | | |
|---|---|---|---|
| 6,720,100 B2* | 4/2004 | Sato | B01J 23/002 |
| | | | 429/479 |
| 6,979,435 B1* | 12/2005 | Shahriari | C01G 1/00 |
| | | | 423/263 |
| 7,951,348 B2* | 5/2011 | Shahriari | C01G 1/00 |
| | | | 423/263 |
| 9,985,139 B2* | 5/2018 | Nomura | H01L 29/66969 |
| 10,350,581 B2 | 7/2019 | Nagao et al. | |
| 2009/0078318 A1* | 3/2009 | Meyers | H01L 31/073 |
| | | | 136/260 |
| 2010/0282320 A1* | 11/2010 | Meyers | H01L 31/073 |
| | | | 136/260 |
| 2011/0281135 A1* | 11/2011 | Gong | B01J 23/80 |
| | | | 428/626 |
| 2015/0197866 A1* | 7/2015 | Toyoda | C25B 1/10 |
| | | | 205/630 |
| 2015/0352530 A1 | 12/2015 | Naga et al. | |
| 2016/0068963 A1* | 3/2016 | Gong | B01J 23/80 |
| | | | 427/554 |
| 2016/0319097 A1* | 11/2016 | Comstock | C09C 1/40 |
| 2018/0008973 A1 | 1/2018 | Gramiccioni et al. | |

FOREIGN PATENT DOCUMENTS

| | | |
|---|---|---|
| JP | 61-086944 A | 5/1986 |
| JP | 2-157043 A | 6/1990 |
| JP | 3-157140 A | 7/1991 |
| JP | 2002-255548 A | 9/2002 |

(Continued)

OTHER PUBLICATIONS

International Search Report (ISR) dated Apr. 3, 2018 filed in PCT/JP2017/046119.
J. Christopher et al., "Catalytic activity and XPS investigation of dalofossite oxides, CuMO2 (M=Al, Cr or Fe)", Journal of Materials Science, 27, pp. 1353-1356, 1992.
Kato, S. et al., "Oxygen storage capacity of CuMO2 (M=Al,Fe,Mn,Ga) with a delafossite-type structure", Applied Catalysis B: Environmental, 2009,vol. 89, pp. 183-188.

*Primary Examiner* — Cam N. Nguyen
(74) *Attorney, Agent, or Firm* — Rankin, Hill & Clark LLP

(57) ABSTRACT

Provided is a novel exhaust gas purification catalyst, which uses a Cu-based delafossite oxide, capable of increasing the exhaust gas purification performance compared to the case of using the Cu-based delafossite oxide alone. Proposed is an exhaust gas purification catalyst comprising a delafossite-type oxide represented by a general formula $ABO_2$ and an inorganic porous material, wherein Cu is contained in the A site of the general formula of the delafossite oxide, one or two or more elements selected from the group consisting of Mn, Al, Cr, Ga, Fe, Co, Ni, In, La, Nd, Sm, Eu, Y, V, and Ti are contained in the B site thereof, and Cu is contained in 3 to 30% relative to the total content (mass) of the delafossite-type oxide and the inorganic porous material.

7 Claims, No Drawings

(56) References Cited

FOREIGN PATENT DOCUMENTS

| JP | 2008-156130 A | 7/2008 |
| JP | 2011-000502 A | 1/2011 |
| WO | 2014-103597 A1 | 7/2014 |
| WO | 2016/115451 A1 | 7/2016 |

\* cited by examiner

EXHAUST GAS PURIFICATION CATALYST

TECHNICAL FIELD

The present invention relates to an exhaust gas purification catalyst that can be used for purifying an exhaust gas emitted from an internal-combustion engine.

BACKGROUND ART

Exhaust gases emitted from internal-combustion engines of automobiles or the like that use gasoline as a fuel include harmful components such as hydrocarbon (HC), carbon monoxide (CO), and nitrogen oxide (NOx). As such, it is necessary to purify each of the harmful components using an oxidation-reduction reaction before emission. For example, it is necessary to purify the exhaust gas such that the hydrocarbon (HC) is converted into water and carbon dioxide by oxidation, the carbon monoxide (CO) is converted into carbon dioxide by oxidation, and the nitrogen oxide (NOx) is converted into nitrogen by reduction.

As a catalyst for treating such an exhaust gas emitted from an internal-combustion engine (hereinafter, referred to as "exhaust gas purification catalyst"), a three-way catalyst (TWC) capable of oxidizing and reducing CO, HC, and NOx has been used.

As this type of three-way catalyst, a catalyst, in which precious metal is supported on a refractory oxide porous material such as an alumina porous material having a wide surface area, and then supported on a substrate such as a monolithic substrate made of a refractory ceramic or metallic honeycomb structure, or on refractory particles, is known.

The exhaust gas purification catalyst is required to always exert high purification performance even under the condition where an air-fuel ratio varies. Therefore, a promoter having oxygen storage/release capacity (OSC) (also referred to as "OSC material") is allowed to coexist with precious metal, thereby securing purification performance.

An oxide such as ceria is the OSC material having oxygen storage/release capacity by which trivalent and tetravalent of Ce ions in a crystal lattice are reversibly changed. The OSC material that is allowed to coexist with precious metal is able to reduce a change in the exhaust gas atmosphere and to greatly improve the purification rate.

In the conventional OSC materials, that is, the oxygen storage/release materials, there has been a problem that the materials cannot exhibit oxygen storage/release performance at lower temperature when precious metal, which is a rare resource, does not exist therein.

Therefore, as an oxygen storage/release material not requiring precious metal, a stacked mixed layer irregular crystal structure delafossite-type oxide having specific oxygen storage/release characteristics is proposed (see Patent Document 1).

However, the above oxide has oxygen storage/release capacity only at a relatively high temperature. Therefore, a delafossite-type oxide, which does not require precious metal, having high oxygen storage/release capacity in a range of low temperature region to high temperature region, and a method for producing the same are proposed in Patent Document 2. Patent Document 2 discloses a delafossite-type oxide that is a 3R type delafossite-type oxide represented by a general formula $ABO_x$ (wherein A represents at least one element selected from the group consisting of Cu, Ag, Pd, and Pt, and B represents at least one element selected from the group consisting of Al, Cr, Ga, Fe, Mn, Co, Rh, Ni, In, La, Nd, Sm, Eu, Y, and Ti); and a method for producing the same, in which raw material powders are mixed in a desired composition ratio, press molded, and calcined under an inert atmosphere.

In addition to the above, in regard to the delafossite-type oxide, $CuMO_2$ (M=Al, Cr, Fe) as a hexagonal system 2H delafossite-type oxide has been examined as an $N_2O$ decomposing catalyst (see Non-Patent Document 1).

CITATION LIST

Non-Patent Document

Non-Patent Document 1: J. of Material Science, 27, 1353 to 1356, 1992

PATENT DOCUMENT

Patent Document 1: Japanese Patent Application Laid-Open (JP-A) No. 2002-255548
Patent Document 2: JP-A No. 2008-156130

SUMMARY OF THE INVENTION

Problem to be Solved by the Invention

As mentioned previously, the Cu-based delafossite-type oxide has been examined as an OSC material as well as an $N_2O$ decomposing catalyst.

The present inventors examine the Cu-based delafossite-type oxide not as an OSC material but as an exhaust gas purification catalyst not requiring precious metal, and confirm that the above catalyst is inferior in exhaust gas purification performance since the gas diffusivity is lower as compared with a precious metal catalyst using precious metal.

Therefore, the present invention relates to an exhaust gas purification catalyst using a Cu-based delafossite-type oxide, and is to provide a novel exhaust gas purification catalyst that is capable of increasing the exhaust gas purification performance compared to the case of using the Cu-based delafossite-type oxide alone.

Means for Solving Problem

The present invention proposes an exhaust gas purification catalyst containing a delafossite-type oxide represented by a general formula $ABO_2$ and an inorganic porous material, wherein Cu is contained in the A site of the general formula of the above delafossite-type oxide, one or two or more elements selected from the group consisting of Mn, Al, Cr, Ga, Fe, Co, Ni, In, La, Nd, Sm, Eu, Y, V, and Ti are contained in the B site thereof, and Cu is contained in 3 to 30% relative to the total content (mass) of the delafossite-type oxide and the inorganic porous material.

Effect of the Invention

Since the Cu-based delafossite-type oxide containing Cu has a layered structure and is able to maintain a dispersion state of Cu serving as an active component in good condition, the Cu-based delafossite-type oxide containing Cu exhibits catalytic activity in spite of having a small specific surface area. Furthermore, since the exhaust gas purification catalyst proposed by the present invention contains the Cu-based delafossite-type oxide and an inorganic porous material, the contact probability with gas is improved by containing the bulky inorganic porous material and delafossite-type oxide. In addition, by containing a predetermined amount of Cu, the exhaust gas purification catalyst is able to exert a function as a three-way catalyst that exhibits excellent performance on $NO_x$ purification which has been heretofore difficult to achieve. Thus, the exhaust gas purification catalyst proposed by the present invention is able to enhance the exhaust gas purification performance compared to that using the Cu-based delafossite-type oxide alone.

Best Mode(s) for Carrying Out the Invention

Next, examples of the embodiments for carrying out the present invention will be described. However, the present invention is not limited to the embodiments described below.
<Present Catalyst>
The exhaust gas purification catalyst according to an example of the present embodiment (referred to as "present catalyst") is an exhaust gas purification catalyst composition that contains a delafossite-type oxide represented by a general formula $ABO_2$ and an inorganic porous material.

Whether or not it is the delafossite-type oxide can be confirmed by identifying peaks through an X-ray diffraction analysis (XRD).

In the present catalyst, it is preferable when the delafossite-type oxide and the inorganic porous material are respectively present in a state of being mixed.

In addition, the delafossite-type oxide may consist of either a single phase of the delafossite or a mixed phase including a by-product phase of another element in addition to the main phase of the delafossite.

The present catalyst may contain other materials if necessary as long as the above delafossite-type oxide and inorganic porous material are contained. Examples thereof may include an OSC material, a stabilizer, a binder, precious metal, and other additive components.

In the present catalyst, the content (mass) ratio of the delafossite-type oxide to the inorganic porous material is preferably 10:90 to 70:30.

The ratio of the content (mass) of the delafossite-type oxide to the total content (mass) of the delafossite-type oxide and the inorganic porous material is preferably 10% or more since Cu serving as an active site can be sufficiently present in the catalyst. Furthermore, the ratio is preferably 70% or less since the contact probability with the exhaust gas can be maintained in a high condition.

From such a viewpoint, the content (mass) ratio of the delafossite-type oxide to the inorganic porous material is preferably 10:90 to 70:30, more preferably 15:85 to 70:30, even more preferably 15:85 to 60:40, still more preferably 20:80 to 50:50. Furthermore, it is especially preferable that the content of the inorganic porous material is more than that of the delafossite-type oxide.

In the present catalyst, the ratio of the average particle diameter (D50) of the delafossite-type oxide to the average particle diameter (D50) of the inorganic porous material is preferably 10:90 to 85:15, more preferably 10:90 to 75:25, even more preferably 15:85 to 60:40, still more preferably 15:85 to 50:50.

The ratio of the average particle diameter (D50) of the delafossite-type oxide to the average particle diameter (D50) of the inorganic porous material is preferably in the aforementioned range, since the delafossite-type oxide and the inorganic porous material are respectively present in a state of being mixed, and the contact probability with the exhaust gas can be maintained in a high condition.

Especially, from the viewpoint of gas diffusibility, it is more preferable that the average particle diameter (D50) of the delafossite-type oxide is smaller than the average particle diameter (D50) of the inorganic porous material, since the delafossite-type oxide is distributed in a highly dispersed state in the inorganic porous material.

Here, the average particle diameter (D50) is the D50 provided by a volume standard particle size distribution obtained by measuring with a laser diffraction scattering-type particle size distribution measuring method. The same applies to the following D50.
<Delafossite-Type Oxide>
The delafossite-type oxide in the present catalyst (referred to as "present delafossite-type oxide") is an oxide represented by a general formula $ABO_2$, in which Cu is contained in the A site of the general formula and one or two or more elements selected from the group consisting of Mn, Al, Cr, Ga, Fe, Co, Ni, In, La, Nd, Sm, Eu, Y, V, and Ti are contained in the B site thereof.

By containing Cu serving as an active component in the A site of the general formula, catalytic activity can be provided to the delafossite-type oxide. Moreover, in the delafossite-type oxide having a layered structure, a dispersion state of Cu can be maintained in good condition.

The A site may either contain or not contain elements other than Cu. Examples of the elements other than Cu may include Ag and the like.

The content of Cu in the present delafossite-type oxide is preferably 80 at. % or more relative to the total content of the elements constituting the A site.

When the content of Cu in the A site is 80 at. % or more, Cu is placed in a high catalytic activity low-valence state, so that the catalyst can be used as a three-way catalyst having excellent $NO_x$ purification performance in particular. From the same viewpoint, the content of Cu is more preferably 90 at. % or more, even more preferably 95 at. % or more.

When Ag as an element other than Cu is contained in the present delafossite-type oxide, it is preferable that the content of Cu is 99.999 at. % or less and the content of Ag is 0.001 at. % or more. Among others, it is more preferable that the content of Cu is 99.9 at. % or less and the content of Ag is 0.1 at. % or more.

By containing 0.001 at. % or more of Ag in the present delafossite-type oxide, Cu is placed in a high catalytic activity low-valence state, so that the CO—NO reactivity can be improved and the purification performance of CO and NO can be enhanced.

Also, in regard to the content of Cu, Cu is preferably contained in 3 to 30% relative to the total content (mass) of the delafossite-type oxide and the inorganic porous material.

It is preferable that Cu is contained in 3% or more relative to the total content (mass) of the delafossite-type oxide and the inorganic porous material, since the active sites are sufficiently present. Furthermore, Cu is preferably contained in 30% or less since a state of high contact probability with the exhaust gas can be maintained.

From such a viewpoint, it is preferable when Cu is contained in 3 to 30% relative to the total content (mass) of the delafossite-type oxide and the inorganic porous material, and it is more preferable when Cu is contained in 5% or more or 25% or less. Among others, from the viewpoint of improving the $NO_x$ purification performance, it is furthermore preferable when Cu is contained in 10% or more or 22% or less.

The B site in the present delafossite-type oxide may be composed of one or two or more elements selected from the group consisting of Mn, Al, Cr, Ga, Fe, Co, Ni, In, La, Nd, Sm, Eu, Y, V, and Ti such that the formal valence in the B site is trivalent.

Among others, it is preferable that the B site is composed of one or two or more elements selected from the group consisting of Mn, Al, Cr, and Ga, since Cu in the A site becomes a stable monovalent state and hardly becomes a bivalent state where the catalytic activity is lower.

Further, it is more preferable when either Mn alone or Mn and one or two or more elements selected from the group consisting of Al, Cr, and Ga are contained in the B site. By containing Mn in the B site in this way, the catalytic activity can be further enhanced. It can be presumed that this result is provided by the effect of a crystal structure distortion, that is, the Jahn-Teller effect.

Here, the atomic ratio of the content of Mn to the total content of Al, Cr, and Ga (Al+Cr+Ga) in the B site is preferably Mn:Al+Cr+Ga=10:90 to 90:10, more preferably 30:70 to 90:10, even more preferably 40:60 to 90:10. Especially, from the viewpoint of improving light-off performance of HC and NO, the atomic ratio is preferably 50:50 to 90:10. Furthermore, it is more preferable when the total content (atomic ratio) of Al, Cr, and Ga is less than the content (atomic ratio) of Mn in the B site, and even more preferable when the atomic ratio is 70:30 to 90:10.

The light-off performance is indicated, for example, by the temperature (T50) (° C.) at which the exhaust gas purification ratio reaches 50%.

(Average Particle Diameter)

The average particle diameter (D50) of the present delafossite-type oxide is preferably 0.1 to 60 μm.

It is preferable that the average particle diameter (D50) of the present delafossite-type oxide is 0.1 μm or more, since the heat resistance can be maintained while maintaining the peeling strength of a substrate and a catalyst layer that will later be described. Also, it is preferable that the average particle diameter (D50) of the present delafossite-type oxide is 60 μm or less, since the gas contactability can be improved while maintaining the peeling strength.

From such a viewpoint, the average particle diameter (D50) of the present delafossite-type oxide is preferably 0.1 to 60 μm, more preferably 5 μm or more or 45 μm or less, even more preferably 7 μm or more or 40 μm or less.

(Synthesis of Present Delafossite-Type Oxide)

In order to obtain the present delafossite-type oxide, either a liquid-phase reaction method or a solid-phase reaction method can be employed.

However, it is preferable to employ the liquid-phase reaction method since the synthesis can be performed by calcining at lower temperature than that of the solid-phase reaction method, the atomization can be uniformly performed, and the specific surface area can be widened.

For example, in a coprecipitation method that is one of the liquid-phase reaction methods, nitrate, sulfate, or acetate is used as a starting raw material and weighed in a desired composition. A sodium hydroxide aqueous solution or the like is used as a precipitation material and dropped into the solution of the starting raw material such as nitrate, sulfate, or acetate, to thereby coprecipitate a precipitate. Then, it is preferable that the resultant precipitate is filtered, washed and dried, and then calcined at a temperature of 800 to 1,200° C. for 1 to 48 hours in a nitrogen atmosphere or air atmosphere. However, the method is not limited to this method.

<Present Inorganic Porous Material>

The inorganic porous material in the present catalyst (referred to "present inorganic porous material") is not for supporting the present delafossite-type oxide but for mixing with the present delafossite-type oxide in order to enhance the contact probability between the catalytic active site and the exhaust gas in the present catalyst.

Examples of the present inorganic porous material may include porous particles of a compound selected from the group consisting of silicon, zirconium, aluminum, and titanium. More specific examples thereof may include porous particles composed of a compound selected from alumina, silica, silica-alumina, alumino-silicates, alumina-zirconia, alumina-chromia, alumina-ceria, and silica-zirconia-alumina. In addition, materials listed as OSC materials, which will later be described, can be also used as the inorganic porous material.

Examples of the alumina may include γ, δ, θ, and α alumina. Among others, γ, δ, or θ alumina is preferably used. A very small amount of La may be contained in the alumina in order to enhance the heat resistance.

It is also preferable when the alumina is modified with an alkaline earth metal oxide, a silicon dioxide, a zirconium dioxide, an oxide of rare earth groups, or an oxide of transition metal such as Cr, Mn, Fe, Co, Ni, Cu, or Ag.

The present inorganic porous material may contain either two or more inorganic porous materials having different particle sizes, or two or more inorganic porous materials composed of different materials.

(Average Particle Diameter)

The average particle diameter (D50) of the present inorganic porous material is preferably 1 to 60 μm.

The average particle diameter (D50) of the present inorganic porous material is preferably 1 μm or more, since the peeling strength can be maintained. Also, the average particle diameter (D50) of the present inorganic porous material is preferably 60 μm or less, since the delafossite-type oxide can be distributed in a highly dispersed state while maintaining the peeling strength.

From such a viewpoint, the average particle diameter (D50) of the present inorganic porous material is preferably 1 to 60 μm, more preferably more than 7 μm or 45 μm or less, even more preferably 10 μm or more or 40 μm or less.

(Specific Surface Area)

The specific surface area of the present inorganic porous material is preferably 70 to 150 $m^2/g$.

The specific surface area of the present inorganic porous material is preferably 70 $m^2/g$ or more, since the delafossite-type oxide can be distributed in a highly dispersed state. Also, the specific surface area thereof is preferably 150 $m^2/g$ or less, since the heat resistance can be maintained.

From such a viewpoint, the specific surface area of the present inorganic porous material is preferably 70 to 150 $m^2/g$, more preferably 75 $m^2/g$ or more or 140 $m^2/g$ or less, even more preferably 80 $m^2/g$ or more or 130 $m^2/g$ or less.

<Other Contained Materials>

As mentioned previously, the present catalyst may contain other materials if necessary as long as the present delafossite-type oxide and the present inorganic porous material are contained. Examples thereof may include an OSC material, a binder, a stabilizer, precious metal, and other additive components.

(OSC Material)

Examples of the OSC material, that is, a promoter having oxygen storage/release capacity may include a cerium oxide, a zirconium oxide, a cerium-zirconium composite oxide, and the like.

(Binder)

As a binder, an inorganic binder, for example, an aqueous solution such as an alumina sol, a silica sol, and a zirconia sol may be used. These can be converted into the form of an inorganic oxide when calcined.

(Stabilizer)

Examples of the stabilizer may include an alkaline earth metal and an alkali metal. Among others, one or two or more metals can be selected from the group consisting of magnesium, barium, calcium, and strontium, and preferably selected from the group consisting of strontium and barium.

(Precious Metal)

The present catalyst is useful as an exhaust gas purification catalyst, especially as a three-way catalyst for internal combustion engines of automobiles or the like that use gasoline as a fuel even without containing precious metal. However, precious metal may be contained.

In this case, examples of the precious metal may include palladium (Pd), platinum (Pt), and rhodium (Rh), and these may be used alone or in combination of two or more kinds thereof.

<Method for Producing Present Catalyst>

The form of the present catalyst may be powdery, aggregated, or a layered structure, that is, a state of a catalyst layer where the catalyst is formed on a substrate.

Hereinafter, the producing method of the present catalyst supported as a catalyst layer on a substrate will be described.

First, a slurry-like catalyst composition can be obtained by mixing and stirring a powder composed of the present delafossite-type oxide, a powder composed of the present inorganic porous material, water, and optionally other materials such as an OSC material, a binder, and a stabilizer, and the catalyst composition can be supported on a substrate to produce the present catalyst.

Specifically, the catalyst layer can be formed as follows: for example, a powder composed of the present delafossite-type oxide, a powder composed of the present inorganic porous material, water, and optionally other materials such as an OSC material, a binder, and a stabilizer are mixed by a ball milling or the like to produce a slurry; and the slurry is coated on a substrate, and then dried and calcined.

Also, the catalyst layer can be formed on the substrate surface as follows: a powder composed of the present delafossite-type oxide, a powder composed of the present inorganic porous material, water, and optionally other materials such as an OSC material, a binder, and a stabilizer are mixed by a ball milling or the like to produce a slurry; and a substrate is immersed into the slurry, and pulled up and calcined.

However, the method for producing the present catalyst may employ any known method, and is not limited to the aforementioned examples.

(Substrate)

Examples of the material of the substrate may include a refractory material such as ceramics and a metal material.

Examples of the substrate material made of ceramics may include a refractory ceramic material such as cordierite, cordierite-alpha alumina, silicon nitride, zircon mullite, spodumene, alumina-silica magnesia, zircon silicate, sillimanite, magnesium silicate, zircon, petalite, alpha alumina, or alumino-silicates.

Examples of the substrate material made of metal may include a refractory metal such as other suitable corrosion resistant alloys based on stainless steel or iron.

Example of the shape of the substrate may include a honeycomb shape, a filter shape, a pellet shape, and a spherical shape.

In the case of using a honeycomb-shaped substrate, for example, a monolithic substrate having numerous fine gas flow passages, that is, channels parallel to each other inside the substrate may be used in order for the gas to flow through the inside of the substrate. Then, the catalyst layer can be formed by coating a catalyst composition on the inner wall surface of each channel of the monolithic substrate by wash coating or the like.

(Catalyst Layer)

The catalyst layer may be a single layer or a multilayer of two or more laminated on the substrate, and different catalyst layers may be formed on the upstream side and downstream side when the exhaust gas flows through.

<Explanation of Terms>

The expression "X to Y" (X and Y are arbitrary numbers) in the present specification also includes the intention of "preferably more than X" or "preferably less than Y" as well as the intention of "X or more and Y or less" unless otherwise stated.

In addition, the expression "X or more" (X is an arbitrary number) or "Y or less" (Y is an arbitrary number) also includes the intention of "preferably more than X" or "preferably less than Y".

EXAMPLES

Hereinafter, the present invention will be described based on the following Examples. However the present invention is not limited to the following Examples.

Example 1

Copper nitrate trihydrate corresponding to 53.6 parts by mass in terms of Cu metal and manganese nitrate hexahydrate corresponding to 46.4 parts by mass in terms of Mn metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 10 hours in a nitrogen atmosphere to thereby obtain a Cu-based delafossite-type oxide powder ($CuMnO_2$).

Next, a θ alumina ($Al_2O_3$) particle powder (D50: 12.4 μm, BET specific surface area: 105 $m^2/g$) was prepared, and 11.2 parts by mass of the Cu-based delafossite-type oxide powder, 80.3 parts by mass of the θ alumina ($Al_2O_3$) particle powder, 8.5 parts by mass of a zirconia binder, and water were mixed and stirred for 2 hours using a propeller such that the content of Cu was 5.2% by mass relative to the total amount of the resultant Cu-based delafossite-type oxide powder and the θ alumina ($Al_2O_3$) particle powder, thereby producing a slurry.

Next, a honeycomb substrate made of stainless (size: ϕ40×60 mm) was immersed into the slurry and pulled out therefrom, and then the excess slurry was blown off. Thereafter, the substrate was dried at 90° C. for 10 minutes and calcined at 500° C. for 1.5 hours to form a catalyst layer, thereby obtaining an exhaust gas purification catalyst (sample).

Example 2

An exhaust gas purification catalyst (sample) was obtained in the same manner as in Example 1 except that a θ alumina ($Al_2O_3$) particle powder of which the average particle diameter (D50) was 31.9 μm and the BET specific surface area was 100 m²/g was used instead of the θ alumina (Al$_2$O$_3$) particle powder in Example 1.

Example 3

Copper nitrate trihydrate corresponding to 52.9 parts by mass in terms of Cu metal, manganese nitrate hexahydrate corresponding to 46.2 parts by mass in terms of Mn metal, and silver nitrate corresponding to 0.9 parts by mass in terms of Ag metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 850° C. for 10 hours in a nitrogen atmosphere to thereby obtain a Cu-based delafossite-type oxide powder ($Cu_{0.99}Ag_{0.01}MnO_2$).

An exhaust gas purification catalyst (sample) was obtained in the same manner as in Example 1 by using the Cu-based delafossite-type oxide powder thus obtained.

Example 4

An exhaust gas purification catalyst (sample) was obtained in the same manner as in Example 1 except that the content of Cu relative to the total amount of the Cu-based delafossite-type oxide powder and the θ alumina (Al$_2$O$_3$) particle powder was changed to 10.4% by mass in Example 1.

Example 5

An exhaust gas purification catalyst (sample) was obtained in the same manner as in Example 1 except that the content of Cu relative to the total amount of the Cu-based delafossite-type oxide powder and the θ alumina (Al$_2$O$_3$) particle powder was changed to 20.8% by mass in Example 1.

Example 6

Copper nitrate trihydrate corresponding to 53.2 parts by mass in terms of Cu metal and iron nitrate nonahydrate corresponding to 46.8 parts by mass in terms of Fe metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 10 hours in a nitrogen atmosphere to thereby obtain a Cu-based delafossite-type oxide powder ($CuFeO_2$).

An exhaust gas purification catalyst (sample) was obtained in the same manner as in Example 1 by using the Cu-based delafossite-type oxide powder thus obtained.

Example 7

Copper nitrate trihydrate corresponding to 70.2 parts by mass in terms of Cu metal and aluminum nitrate nonahydrate corresponding to 29.8 parts by mass in terms of Al metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 1,100° C. for 10 hours in a nitrogen atmosphere to thereby obtain a Cu-based delafossite-type oxide powder ($CuAlO_2$).

An exhaust gas purification catalyst (sample) was obtained in the same manner as in Example 1 by using the Cu-based delafossite-type oxide powder thus obtained.

Example 8

Copper nitrate trihydrate corresponding to 55.0 parts by mass in terms of Cu metal and chromium nitrate nonahydrate corresponding to 45.0 parts by mass in terms of Cr metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 10 hours in a nitrogen atmosphere to thereby obtain a Cu-based delafossite-type oxide powder ($CuCrO_2$).

An exhaust gas purification catalyst (sample) was obtained in the same manner as in Example 1 by using the Cu-based delafossite-type oxide powder thus obtained.

Example 9

Copper nitrate trihydrate corresponding to 54.7 parts by mass in terms of Cu metal, manganese nitrate hexahydrate corresponding to 9.5 parts by mass in terms of Mn metal, and chromium nitrate nonahydrate corresponding to 35.8 parts by mass in terms of Cr metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 10 hours in a nitrogen atmosphere to thereby obtain a Cu-based delafossite-type oxide powder ($CuCr_{0.8}Mn_{0.2}O_2$).

An exhaust gas purification catalyst (sample) was obtained in the same manner as in Example 1 by using the Cu-based delafossite-type oxide powder thus obtained.

Example 10

Copper nitrate trihydrate corresponding to 56.3 parts by mass in terms of Cu metal, manganese nitrate hexahydrate corresponding to 38.9 parts by mass in terms of Mn metal, and aluminum nitrate nonahydrate corresponding to 4.8 parts by mass in terms of Al metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 950° C. for 10 hours in a nitrogen atmosphere to thereby obtain a Cu-based delafossite-type oxide powder ($CuAl_{0.2}Mn_{0.8}O_2$).

An exhaust gas purification catalyst (sample) was obtained in the same manner as in Example 1 by using the Cu-based delafossite-type oxide powder thus obtained.

Example 11

Copper nitrate trihydrate corresponding to 60.8 parts by mass in terms of Cu metal, manganese nitrate hexahydrate corresponding to 26.3 parts by mass in terms of Mn metal, and aluminum nitrate nonahydrate corresponding to 12.9 parts by mass in terms of Al metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 950° C. for 10 hours in a nitrogen atmosphere to thereby obtain a Cu-based delafossite-type oxide powder ($CuAl_{0.5}Mn_{0.5}O_2$).

An exhaust gas purification catalyst (sample) was obtained in the same manner as in Example 1 by using the Cu-based delafossite-type oxide powder thus obtained.

Example 12

Copper nitrate trihydrate corresponding to 66.1 parts by mass in terms of Cu metal, manganese nitrate hexahydrate corresponding to 11.4 parts by mass in terms of Mn metal, and aluminum nitrate corresponding to 22.5 parts by mass in terms of Al metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 950° C. for 10 hours in a nitrogen atmosphere to thereby obtain a Cu-based delafossite-type oxide powder ($CuAl_{0.8}Mn_{0.2}O_2$).

An exhaust gas purification catalyst (sample) was obtained in the same manner as in Example 1 by using the Cu-based delafossite-type oxide powder thus obtained.

Using an X-ray diffractometer (Mini Flex 600, target: Cu, accelerating voltage: 40 kV, manufactured by Rigaku Corporation), the peak pattern of the Cu-based delafossite-type oxide powder used in each of Examples 1 to 12 was measured, and as a result, it was confirmed that a crystal structure of a 3R-type delafossite-type oxide was obtained.

Furthermore, the exhaust gas purification catalyst (sample) obtained in each of Examples 1 to 12 was observed by an electron microscope, and as a result, it was confirmed that the delafossite-type oxide particles and the inorganic porous particles were not supported with each other but were respectively present in a state of being mixed.

Comparative Example 1

An exhaust gas purification catalyst (sample) was obtained in the same manner as in Example 1 except that the θ alumina ($Al_2O_3$) particle powder was removed from the Cu-based delafossite-type oxide powder in Example 1.

Comparative Example 2

An exhaust gas purification catalyst (sample) was obtained in the same manner as in Example 1 except that the content of Cu relative to the total amount of the Cu-based delafossite-type oxide powder and the θ alumina ($Al_2O_3$) particle powder was changed to 2.7% by mass in Example 1.

<Measurement of Cu Content>

With regard to the exhaust gas purification catalyst (sample) obtained in each of Examples and Comparative Examples, the content of Cu was measured by a calibration curve method using an X-ray fluorescence spectrometer (ZSX Primus II, manufactured by Rigaku Corporation).

Each of the obtained contents of Cu was shown in Tables 1 and 2 as a mass ratio relative to the total content of the delafossite-type oxide and the inorganic porous material.

<Measurement of Average Particle Diameter>

With regard to the exhaust gas purification catalyst (sample) obtained in each of Examples and Comparative Examples, the average particle diameter (D50) of each of the delafossite-type oxide and the alumina was measured using a laser diffraction scattering-type particle size distribution, and the results were shown in Tables 1 and 2.

Each of the samples (powders) was introduced into an aqueous solvent by using an automatic sample supply machine for a laser diffraction particle size distribution measuring device ("Microtorac SDC", manufactured by Nikkiso Co., Ltd.), and the sample was irradiated with ultrasonic waves of 30 W at a flow rate of 50% for 360 seconds. Thereafter, the particle size distribution was measured by using a laser diffraction particle size distribution measuring device "MT3000II" manufactured by Nikkiso Co., LTD., and the D50 was then measured from the obtained volume-basis particle size distribution chart. In this case, it was determined under the conditions where the refractive index of the particle was 1.5, the particle shape was spherical, the refractive index of the solvent was 1.3, the zero-setting was 30 seconds, the measurement time was 30 seconds, and the average value was from two measurements.

<Exhaust Gas Purification Performance Test>

The catalytic activity was evaluated as follows after the exhaust gas purification catalyst (sample) obtained in each of Examples and Comparative Examples was aged. The durability condition was at 950° C. for 4 hours under air atmosphere.

Using a catalyst evaluation device (SIGU-1000, manufactured by HORIBA, Ltd.), the exhaust gas purification catalyst (sample) was set in a reaction furnace thereof, and a model gas composed of CO: 1.4%, NO: 1,500 ppm, $C_3H_6$: 500 ppmC, $O_2$: 0.7%, and the residual of $N_2$ was circulated in the reaction furnace. Then, the outlet gas components were measured at 100 to 600° C. using an automobile exhaust gas measuring device (MEXA-7100, manufactured by HORIBA Ltd.). From the results of the light-off performance evaluation, the temperature (T50) (° C.) at which the model gas was purified to 50% and the purification rate (η400) (%) of the model gas at 400° C. were determined, and the results were shown in Tables 3 and 4.

TABLE 1

| No. | Type of Delafossite | Average Particle Diameter of Delafossite (D50/μm) | Inorganic Porous Material | Average Particle Diameter of Inorganic Porous Material (D50/μm) | Delafossite in (Delafossite + Inorganic Porous Material) (% by mass) | Cu in (Delafossite + Inorganic Porous Material) (% by mass) |
|---|---|---|---|---|---|---|
| Comparative Example 1 | $CuMnO_2$ | 27.8 | — | — | 100.0 | 42.2 |
| Comparative Example 2 | $CuMnO_2$ | 27.8 | θ alumina | 12.4 | 6.5 | 2.7 |
| Example 1 | $CuMnO_2$ | 27.8 | θ alumina | 12.4 | 12.3 | 5.2 |
| Example 2 | $CuMnO_2$ | 27.8 | θ alumina | 31.9 | 12.3 | 5.2 |
| Example 3 | $Cu_{0.99}Ag_{0.01}MnO_2$ | 40.0 | θ alumina | 12.4 | 12.5 | 5.2 |
| Example 4 | $CuMnO_2$ | 27.8 | θ alumina | 12.4 | 24.6 | 10.4 |
| Example 5 | $CuMnO_2$ | 27.8 | θ alumina | 12.4 | 49.2 | 20.8 |
| Example 6 | $CuFeO_2$ | 36.4 | θ alumina | 12.4 | 12.4 | 5.2 |
| Example 7 | $CuAlO_2$ | 24.3 | θ alumina | 12.4 | 10.0 | 5.2 |
| Example 8 | $CuCrO_2$ | 3.2 | θ alumina | 12.4 | 12.1 | 5.2 |

TABLE 2

| No. | Type of Delafossite | Average Particle Diameter of Delafossite (D50/μm) | Inorganic Porous Material | Average Particle Diameter of Inorganic Porous Material (D50/μm) | Delafossite in (Delafossite + Inorganic Porous Material) (% by mass) | Cu in (Delafossite + Inorganic Porous Material) (% by mass) |
|---|---|---|---|---|---|---|
| Example 1 | $CuMnO_2$ | 27.8 | θ alumina | 12.4 | 12.3 | 5.2 |
| Example 9 | $CuCr_{0.8}Mn_{0.2}O_2$ | 3.7 | θ alumina | 12.4 | 12.1 | 5.2 |
| Example 10 | $CuAl_{0.2}Mn_{0.8}O_2$ | 40.8 | θ alumina | 12.4 | 11.9 | 5.2 |
| Example 11 | $CuAl_{0.5}Mn_{0.5}O_2$ | 52.0 | θ alumina | 12.4 | 11.2 | 5.2 |
| Example 12 | $CuAl_{0.8}Mn_{0.2}O_2$ | 56.6 | θ alumina | 12.4 | 10.5 | 5.2 |

TABLE 3

| No. | Type of Delafossite | T50 (° C.) CO | T50 (° C.) HC | T50 (° C.) NO | η400 (%) CO | η400 (%) HC | η400 (%) NO |
|---|---|---|---|---|---|---|---|
| Comparative Example 1 | $CuMnO_2$ | 578 | 600 or more | 600 or more | 16 | 1 | 0 |
| Comparative Example 2 | $CuMnO_2$ | 386 | 470 | 448 | 57 | 33 | 11 |
| Example 1 | $CuMnO_2$ | 273 | 447 | 404 | 77 | 41 | 45 |
| Example 2 | $CuMnO_2$ | 253 | 423 | 391 | 87 | 45 | 67 |
| Example 3 | $Cu_{0.99}Ag_{0.01}MnO_2$ | 247 | 436 | 390 | 83 | 44 | 62 |
| Example 4 | $CuMnO_2$ | 290 | 431 | 388 | 87 | 43 | 63 |
| Example 5 | $CuMnO_2$ | 236 | 406 | 352 | 92 | 47 | 75 |
| Example 6 | $CuFeO_2$ | 262 | 431 | 416 | 68 | 43 | 33 |
| Example 7 | $CuAlO_2$ | 257 | 402 | 402 | 74 | 49 | 46 |
| Example 8 | $CuCrO_2$ | 290 | 412 | 410 | 66 | 46 | 37 |

TABLE 4

| No. | Type of Delafossite | T50 (° C.) CO | T50 (° C.) HC | T50 (° C.) NO | η400 (%) CO | η400 (%) HC | η400 (%) NO |
|---|---|---|---|---|---|---|---|
| Example 1 | $CuMnO_2$ | 273 | 447 | 404 | 77 | 41 | 45 |
| Example 9 | $CuCr_{0.8}Mn_{0.2}O_2$ | 255 | 410 | 398 | 78 | 48 | 54 |
| Example 10 | $CuAl_{0.2}Mn_{0.8}O_2$ | 254 | 410 | 399 | 77 | 48 | 51 |
| Example 11 | $CuAl_{0.5}Mn_{0.5}O_2$ | 262 | 419 | 413 | 70 | 46 | 35 |
| Example 12 | $CuAl_{0.8}Mn_{0.2}O_2$ | 257 | 420 | 414 | 70 | 46 | 36 |

From the results shown in Tables 1 and 3, it was found that when the content mass of Cu relative to the total mass of the Cu-based delafossite-type oxide powder and the θ alumina ($Al_2O_3$) particle powder in the exhaust gas purification catalyst (sample) was set to 3 to 30%, a three-way catalyst having excellent $NO_x$ purification performance could be obtained. Furthermore, it was found that when Cu is contained preferably in 5% or more or 25% or less, more preferably in 10% or more or 22% or less, a more excellent three-way catalyst could be obtained.

Also, from the results shown in Tables 2 and 4, it was found that Mn and one or two or more elements selected from the group consisting of Al, Cr, and Ga were preferably contained in the B site of the exhaust gas purification catalyst (sample), and the atomic ratio of the content of Mn relative to the total content of Al, Cr, and Ga (Al+Cr+Ga) in the B site was preferably 10:90 to 90:10, more preferably 30:70 to 90:10, even more preferably 40:60 to 90:10. Especially, it was found that the atomic ratio was preferably 50:50 to 90:10, the total content (atomic ratio) of Al, Cr, and Ga was more preferably smaller than the content (atomic ratio) of Mn in the B site, and the atomic ratio was even more preferably 70:30 to 90:10, from the viewpoint of improving the light-off performance of HC and NO.

The invention claimed is:
1. An exhaust gas purification catalyst, comprising a delafossite-type oxide represented by a general formula $ABO_2$ and an inorganic porous material,
wherein Cu is comprised in the A site of the general formula of the delafossite-type oxide, one or two or more elements selected from the group consisting of Mn, Al, Cr, Ga, Fe, Co, Ni, In, La, Nd, Sm, Eu, Y, V, and Ti are comprised in the B site thereof, and

Cu is comprised in 3 to 30% relative to the total content (mass) of the delafossite-type oxide and the inorganic porous material.

2. The exhaust gas purification catalyst according to claim 1, wherein the content (mass) ratio of the delafossite-type oxide to the inorganic porous material is 10:90 to 70:30.

3. The exhaust gas purification catalyst according to claim 1, wherein the ratio of an average particle diameter (D50) of the delafossite-type oxide to the average particle diameter (D50) of the inorganic porous material is 10:90 to 85:15.

4. The exhaust gas purification catalyst according to claim 1, wherein one or two or more elements selected from the group consisting of Mn, Al, Cr, and Ga are comprised in the B site of the general formula.

5. The exhaust gas purification catalyst according to claim 1, wherein only Mn is comprised in the B site of the general formula or Mn and one or two or more elements selected from the group consisting of Al, Cr, and Ga are comprised therein.

6. The exhaust gas purification catalyst according to claim 1, wherein Mn and one or two or more elements selected from the group consisting of Al, Cr, and Ga are comprised in the B site of the general formula, and the atomic ratio of the content of Mn to the total content of Al, Cr, and Ga in the B site is 10:90 to 90:10.

7. The exhaust gas purification catalyst, having a configuration in which the exhaust gas purification catalyst according to claim 1 is supported on a substrate made of metal or ceramics.

* * * * *